United States Patent
Jing et al.

(10) Patent No.: US 8,624,429 B2
(45) Date of Patent: Jan. 7, 2014

(54) SINGLE-INDUCTOR-MULTIPLE-OUTPUT REGULATOR WITH AUTO-HOPPING CONTROL AND THE METHOD OF USE

(75) Inventors: Xiaocheng Jing, Hong Kong (CN); Kwok Tai Philip Mok, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 720 days.

(21) Appl. No.: 12/840,149

(22) Filed: Jul. 20, 2010

(65) Prior Publication Data

US 2011/0043181 A1 Feb. 24, 2011

Related U.S. Application Data

(60) Provisional application No. 61/271,225, filed on Jul. 20, 2009.

(51) Int. Cl.
*H02J 1/10* (2006.01)
*H02J 7/34* (2006.01)
*H02J 3/38* (2006.01)

(52) U.S. Cl.
USPC ............... 307/18; 307/31; 307/39; 307/82; 323/222; 323/282; 323/88

(58) Field of Classification Search
USPC .............. 307/18, 31, 41; 323/222, 284, 288
See application file for complete search history.

(56) References Cited

U.S. PATENT DOCUMENTS

| 6,075,295 | A | 6/2000 | Li |
| 6,552,917 | B1 | 4/2003 | Bourdillon |
| 6,689,947 | B2 | 2/2004 | Ludwig |
| 6,728,517 | B2 | 4/2004 | Sugar et al. |
| 6,849,795 | B2 | 2/2005 | Ludwig |
| 7,038,123 | B2 | 5/2006 | Ludwig |
| 7,061,214 | B2 | 6/2006 | Mayega et al. |
| 7,224,085 | B2 | 5/2007 | Chen et al. |
| 7,256,568 | B2 * | 8/2007 | Lam et al. ............ 323/222 |
| 7,432,614 | B2 * | 10/2008 | Ma et al. ............ 307/31 |
| 7,507,902 | B2 | 3/2009 | Ludwig |
| 7,652,461 | B2 * | 1/2010 | Tateishi ............ 323/284 |
| 2002/0062472 | A1 | 5/2002 | Medlock et al. |
| 2007/0207837 | A1 | 9/2007 | Nakaya |
| 2008/0136395 | A1 * | 6/2008 | Bennett ............ 323/288 |
| 2008/0231115 | A1 * | 9/2008 | Cho et al. ............ 307/41 |
| 2010/0067152 | A1 * | 3/2010 | Nakahashi et al. ...... 361/18 |
| 2010/0308654 | A1 * | 12/2010 | Chen ............ 307/31 |
| 2012/0062299 | A1 * | 3/2012 | Kurokawa ............ 327/237 |

OTHER PUBLICATIONS

Jing et al., "A wide-load-range single-inductor-dual-output boost regulator with minimized cross-regulation by constant-charge-auto-hopping (CCAH) control," IEEE Custom Integrated Circuits Conference 2009 (CICC '09), 299-302 (Sep. 13-16, 2009).

(Continued)

*Primary Examiner* — Jared Fureman
*Assistant Examiner* — Toan Vu
(74) *Attorney, Agent, or Firm* — Leydig, Voit & Mayer, Ltd.

(57) ABSTRACT

A switching regulator is provided herein comprising a voltage source, a plurality of switching elements, an inductive element, and a controller. The controller coordinates the plurality of switching elements as to sequentially and periodically switching the inductive element to generate a plurality of regulated DC voltages. The controller adjusts a switching frequency of the regulator in accordance with at least one characteristic of a load current.

13 Claims, 11 Drawing Sheets

(56) References Cited

OTHER PUBLICATIONS

Ma et al., "A Pseudo-CCM/DCM SIMO Switching Converter With Freewheel Switching," IEEE Journal of Solid-State Circuits, Jun. 2003, pp. 1007-1014, vol. 38, No. 6, Institute of Electrical and Electronics Engineers, New York, New York.

Ma et al., "Single-inductor-multiple-output switching converters with time-multiplexing control in discontinuous conduction mode," IEEE Journal of Solid-State Circuits, 2003, pp. 89-100, vol. 38, No. 1, Institute of Electrical and Electronics Engineers, New York, New York.

Le at al., "A Single-Inductor Switching DC-DC Converter with 5 Outputs and Ordered Power-Distributive Control," IEEE International Solid-State Circuits Conference, Feb. 2007, pp. 534-535, 620, Institute of Electrical and Electronics Engineers, New York, New York.

Seol et al., "A Synchronous Multioutput Step-Up/Down DC-DC Converter With Return Current Control," IEEE Transactions on Circuits and Systems II: Express Briefs, Mar. 2009, pp. 210-214, vol. 56, No. 3, Institute of Electrical and Electronics Engineers, New York, New York.

Koon et al., "Integrated charge-control single-inductor dual-output step-up/step-down converter," IEEE International Symposium on Circuits and Systems, 2005, pp. 3071-3074, vol. 4, Institute of Electrical and Electronics Engineers, New York, New York.

Sze et al., "Integrated single-inductor dual-input dual-output boost converter for energy harvesting applications," IEEE International Symposium on Circuits and Systems, 2008, pp. 2218-2221, Institute of Electrical and Electronics Engineers, New York, New York.

Woo et al., "Load-Independent Control of Switching DC-DC Converters with Freewheeling Current Feedback," IEEE International Solid-State Circuits Conference, Dec. 2008, pp. 2798-2808, vol. 43, No. 12, Institute of Electrical and Electronics Engineers, New York, New York.

Pizzutelli et al., "Novel control technique for single inductor multiple output converters operating in CCM with reduced cross-regulation," IEEE Applied Power Electronics Conference and Exposition, 2008, pp. 1502-1507, Institute of Electrical and Electronics Engineers, New York, New York.

Huang et al., "Single-inductor dual-output DC-DC converters with high light-load efficiency and minimized cross-regulation for portable devices," IEEE Symposium on VLSI Circuits, Jun. 2008, pp. 132-133, Institute of Electrical and Electronics Engineers, New York, New York.

Jia et al., "A Single-Inductor Dual-Output Pseudo-DCM/CCM Buck and Boost Converter with Adaptive DC Current Compensation," 2009, pp. 2641-2644, Institute of Electrical and Electronics Engineers, New York, New York.

Woo et al., "Load-Independent Control of Switching DC-DC Converters with Freewheeling Current Feedback," IEEE International Solid-State Circuits Conference, Feb. 2008, pp. 446-447, 626, Institute of Electrical and Electronics Engineers, New York, New York.

Seol et al., "Multiple-Output Step-Up/Down Switching DC-DC Converter with Vestigial Current Control," IEEE International Solid-State Circuits Conference, Feb. 2009, pp. 442-443, Institute of Electrical and Electronics Engineers, New York, New York.

Jing et al., "A Wide-Load-Range Single-Inductor-Dual-Output Boost Regulator with Minimized Cross-Regulation by Constant-Charge-Auto-Hopping (CCAH) Control," IEEE Custom Integrated Circuits Conference, Sep. 2009, pp. 299-302, Institute of Electrical and Electronics Engineers, New York, New York.

Huang et al., "Single-Inductor Multi-Output (SIMO) DC-DC Converters With High Light-Load Efficiency and Minimized Cross-Regulation for Portable Devices," IEEE Journal of Solid-State Circuits, Apr. 2009, pp. 1099-1111, Institute of Electrical and Electronics Engineers, New York, New York.

Xu et al., "A single-inductor dual-output switching converter with low ripples and improved cross-regulation," IEEE Custom Integrated Circuits Conference, Sep. 2009, pp. 303-306, Institute of Electrical and Electronics Engineers, New York, New York.

Belloni et al., "A 4-output single-inductor DC-DC buck converter with self-boosted switch drivers and 1.2 A total output current," IEEE International Solid-State Circuits Conference, Feb. 2008, pp. 444-445, 626, Institute of Electrical and Electronics Engineers, New York, New York.

Bonizzoni et al., "A 200mA 93% Peak Efficiency Single-Inductor Dual-Output DC-DC Buck Converter," IEEE International Solid-State Circuits Conference, Feb. 2007, pp. 526-527, 619, Institute of Electrical and Electronics Engineers, New York, New York.

Kim et al., "Single-inductor dual-input dual-output buck-boost fuel-cell-Li-ion charging dc-dc supply," IEEE International Solid-State Circuits Conference, Feb. 2009, pp. 444-445, Institute of Electrical and Electronics Engineers, New York, New York.

Kwon et al., "Single-inductor-multiple-output switching converters," IEEE Transactions on Circuits and Systems—II: Express Briefs, Aug. 2009, pp. 614-618, vol. 56, No. 8, Institute of Electrical and Electronics Engineers, New York, New York.

Su et al., "An Ultra Fast Fixed Frequency Buck converter with Maximum Charging Current Control and Adaptive Delay Compensation for DVS Applications," Symposium on VLSI Circuits Digest of Technical Papers, 2007, Institute of Electrical and Electronics Engineers, New York, New York.

Man et al., "A 0.9-V Input Discontinuous-Conduction-Mode Boost Converter with CMOS-Control Rectifier," IEEE Journal of Solid-State Circuits, Sep. 2008, pp. 2036-2046, vol. 43, No. 9, Institute of Electrical and Electronics Engineers, New York, New York.

Man et al., "An Auto-Selectable-Frequency Pulse-Width Modulator for Buck Converters with Improved Light-Load Efficiency," IEEE International Solid-State Circuits Conference, Feb. 2008, pp. 440-441, 626, Institute of Electrical and Electronics Engineers, New York, New York.

Leung et. al., "A 1-V Integrated Current-Mode Boost Converter in Standard 3.3/5-V CMOS Technologies," IEEE Journal of Solid-State Circuits, Nov. 2005, pp. 2265-2274, vol. 40, No. 11, Institute of Electrical and Electronics Engineers, New York, New York.

Lee et al., "A Monolithic Current-Mode CMOS DC-DC Converter With On-Chip Current-Sensing Technique," IEEE Journal of Solid-State Circuits, Jan. 2004, pp. 3-14, vol. 39, No. 1, Institute of Electrical and Electronics Engineers, New York, New York.

* cited by examiner

SINGLE-INDUCTOR-MULTIPLE-OUTPUT REGULATOR WITH AUTO-HOPPING CONTROL AND THE METHOD OF USE

CROSS-REFERENCE TO RELATED APPLICATION

This application claims the benefit of U.S. Provisional Patent Application No. 61/271,225, filed on Jul. 20, 2009, which is incorporated herein by reference in its entirety.

FIELD OF INVENTION

This invention relates in general to DC-to-DC converter and in particular to a single-inductor-multiple-output switching regulator with low cross-regulation and extended driving capability.

BACKGROUND OF INVENTION

Single-inductor-multiple-output (SIMO) DC-to-DC converter is an important component for portable electronic devices such as cell phone or personal digital assistant (PDA), which requires different supply voltages that are low cost, high efficiency and small in size. However, one major limitation of conventional SIMO converter is cross-regulation. In other words, the outputs of the converter cannot be regulated independently and any load change in one output will affect the others. This is more severe when a large change occurs to the load currents.

Among existing SIMO converter implementations, time-multiplexing control methods suffers from limited power capacity and cross-regulation during large load transient even operating in pseudo-continuous-conduction-mode (PCCM). The operation of this type of SIMO is shown in FIGS. 1(a)-(c) as described in D. Ma et al., "Single-inductor-multiple-output switching converters with time-multiplexing control in discontinuous conduction mode," IEEE J. of Solid-State Circuits, vol. 38, no. 1, pp. 89-100, 2003, which is hereby incorporated by reference in its entirety and for everything it describes therein. For small cross-regulation, if the given phase is unable to handle the required charge for the corresponding output and during load transient, the cross-regulation will become serious as shown in FIG. 1(c).

It has been proposed to use comparator controlled output control to reduce cross-regulation by fast response of the comparator controlled output. The operation of this conventional technique is shown in FIG. 2(a)-2(c), as further described in H. P. Le et al., "A Single-Inductor Switching DC-DC Converter with 5 Outputs and Ordered Power-Distributive Control," IEEE Int. Solid-State Circuits Conf., pp. 534-620, 2007, which is hereby incorporated by reference in its entirety and for everything it describes therein. However, the response time is limited by the last and additional pulse-width-modulated (PWM) controlled output stage, a larger cross-regulation is expected for large load current change as the regulation of the two outputs is not independent to each other, and the output might have a low accuracy due to the nature of the comparator control. FIG. 2(c) shows the cross-regulation when there is a load change at the first output. In this situation, the last output stages receive no charge at several cycles. This problem becomes worse when the number of output stages increases and the PWM controlling the output stage cannot response promptly.

A charge-control technique with large power capacity operating in continuous-conduction-mode (CCM) is described in A. Pizzutelli et al., "Novel control technique for single inductor multiple output converters operating in CCM with reduced cross-regulation," in IEEE Applied Power Electronics Conference and Exposition, pp. 1502-1507, 2008, which is hereby incorporated by references in its entirety and for everything it describes therein. This system has similar operation principle as the comparator-controlled output control. In there, the cross-regulation is still significant and the technique is only suitable for implementation in buck converter.

SUMMARY OF INVENTION

The present invention provides a single-inductor DC-to-DC switching regulator with multiple outputs regulated independently. The regulator can deliver large unbalanced currents through the sub-converters with minimized cross-regulation.

According to some embodiments of the present invention, a SIMO boost DC-to-DC converter with sequential-control is provided. Compared to conventional devices, the switching frequency of SIMO converter described herein can be automatically hopped to multiples fraction of the pre-defined frequency based on its load currents during load transient without using load current sensor. The switching cycle ends when energy transfer of all the outputs has been finished and a new switching cycle is triggered by the next coming fundamental clock signal. This frequency hopping control extends the maximum power capacity for a pre-defined switching frequency. Since the switching frequency is automatically hopped to 1/N of the fundamental switching frequency, the switching noise spectrum of the system can be predictable.

Minimized cross-regulation can be achieved due to the independently regulated outputs and the cross-regulation induced by frequency hopping can also be minimized by Constant-Charge-Auto-Hopping (CCAH) control which ensures to deliver a constant charge to the unchanged outputs during load transient. A frequency detection unit detects the frequency information of the presented converter, which is used to set the inductor current charging time (i.e., peak inductor current) to the required level in one switching cycle to realize constant-charge control.

This control technique can be extended to single-inductor multiple-input-multiple-output converter and can also be applied to buck, buck-boost, boost-buck and other different converter topologies.

BRIEF DESCRIPTION OF THE DRAWINGS

An embodiment of the invention will now be described by the way of principles of operation and with reference to accompanying drawings, in which.

DETAILED DESCRIPTION OF PREFERRED EMBODIMENT

Figure 1:
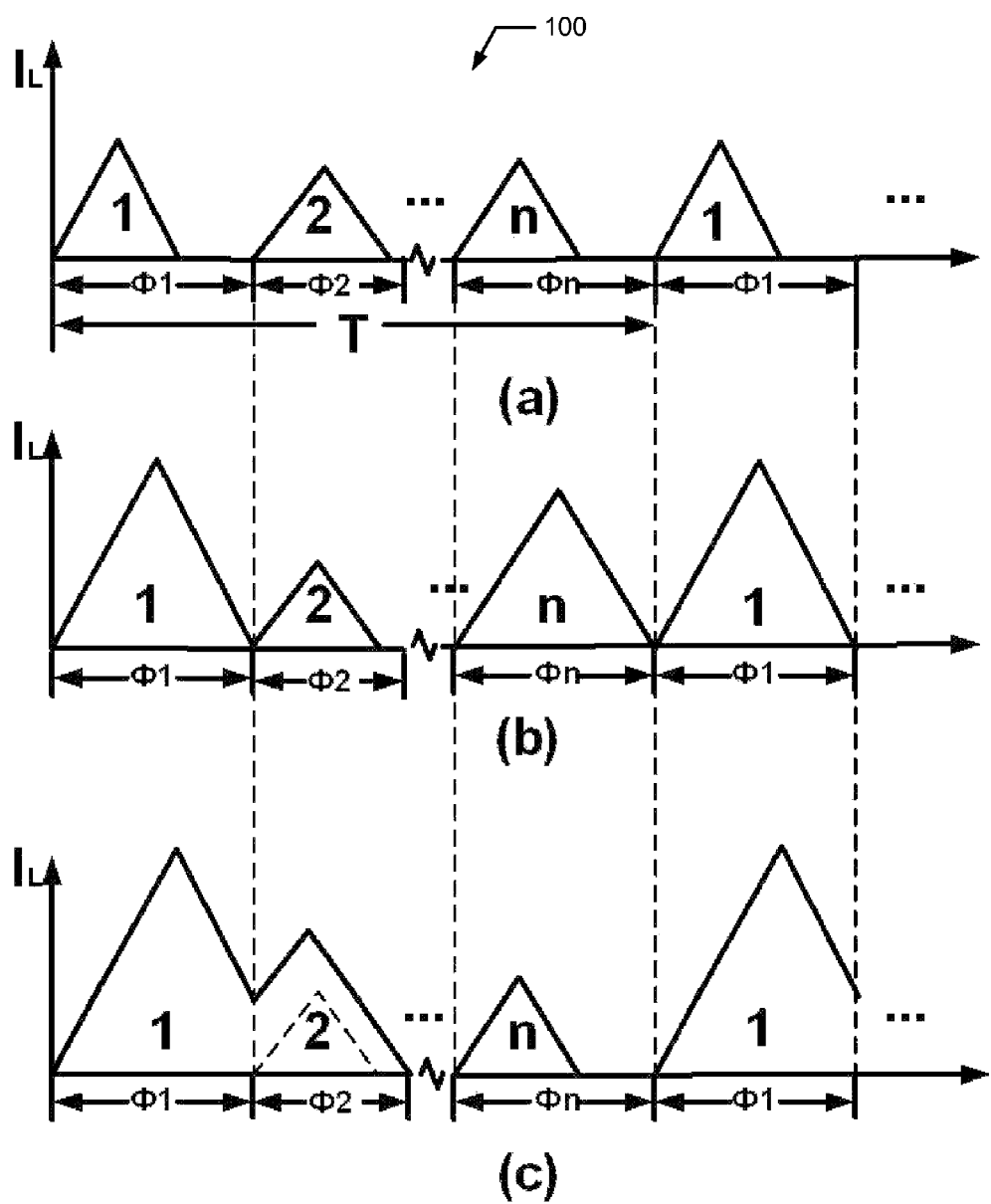
FIGS. 1(a)-(c) depict timing diagrams of a conventional SIMO converter.
Figure 2:
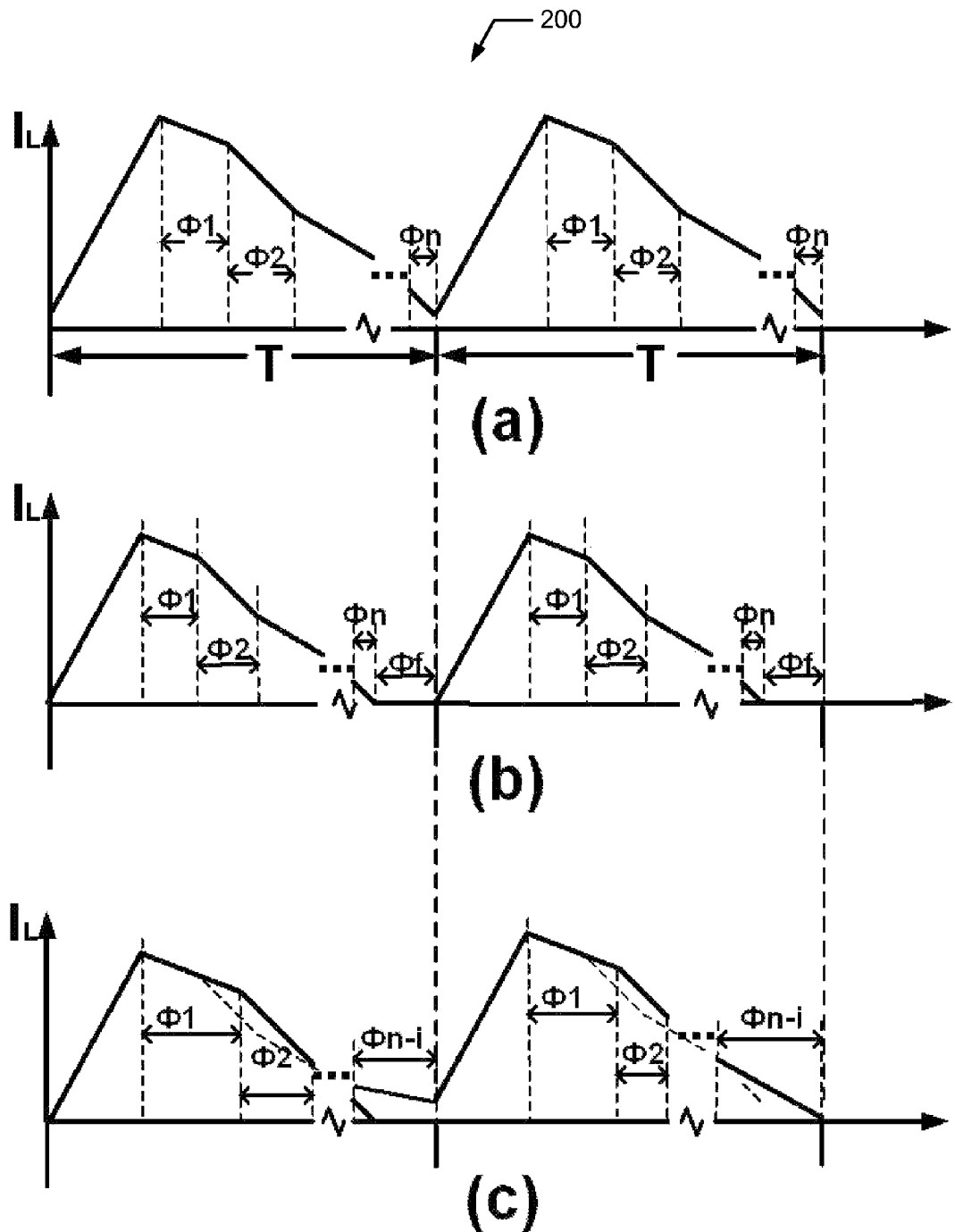
FIGS. 2(a)-(c) depict timing diagrams of another conventional SIMO converter with a comparator controlled output control.
Figure 3:
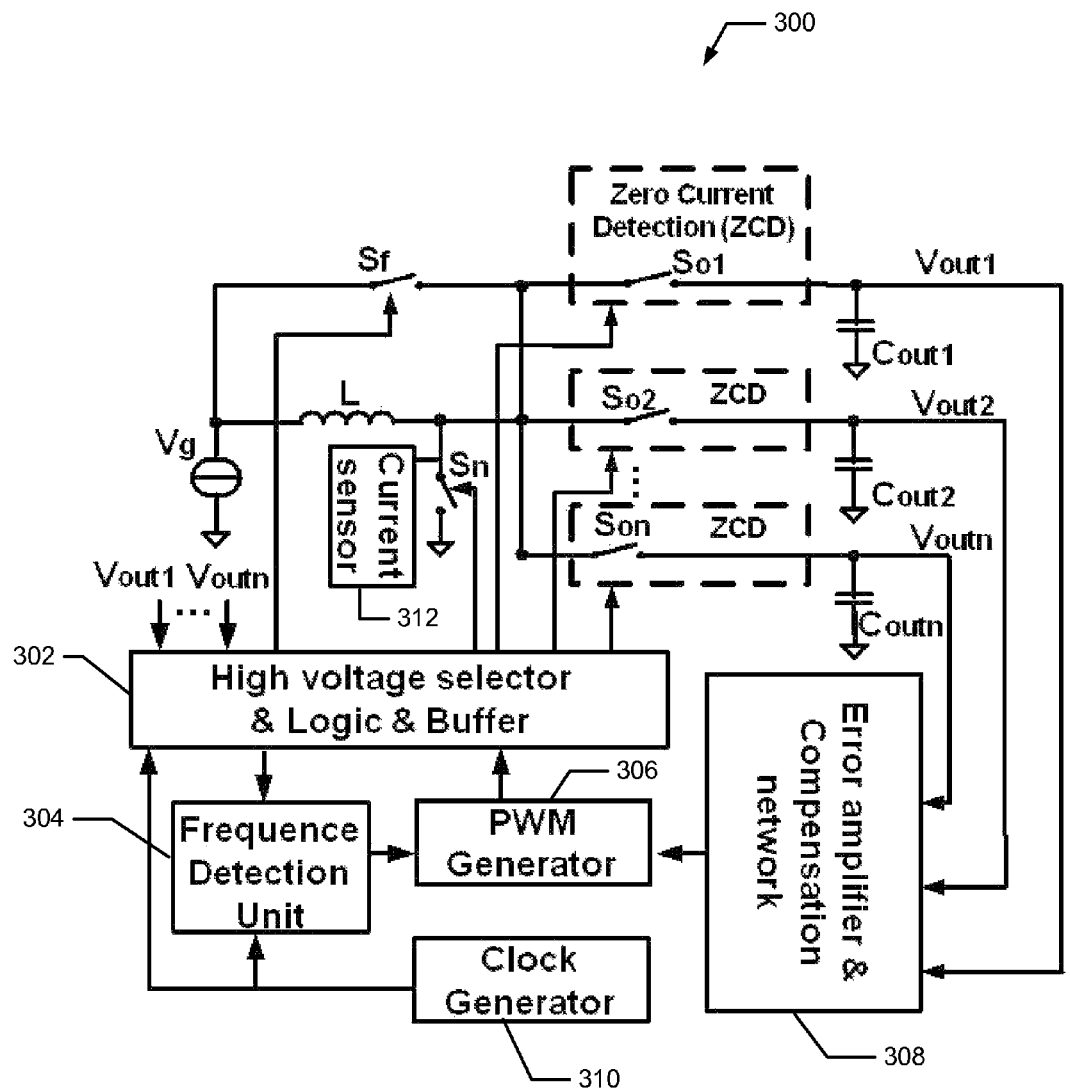
FIG. 3 depicts a schematic diagram of a SIMO boost converter according to an embodiment of the present invention.

FIG. 3 depicts a schematic diagram of a SIMO boost switching regulator 300 with sequential-control according to one embodiment of the invention. Regulator 300 includes a voltage source $V_g$, an inductor L, a freewheel switch $S_f$, a main switch $S_n$, and a plurality of output switches $S_{o1}$-$S_{on}$. These switches include transistors such as the metal-oxide-semiconductor field-effect transistor (MOSFET). Each output circuit further includes an output capacitor, $C_{out1}$-$C_{outn}$, connected between the respective output terminal $V_{out1}$-$V_{out2}$ and a reference voltage (e.g., electrical ground). Each of the output switches $S_{o1}$-$S_{on}$ and the respective output capacitor $C_{out1}$-$C_{outn}$ form a sub-converter.

Regulator 300 further includes an error amplifier and compensation network 308 to ensure system stability through a feedback mechanism with high accuracy. According to one embodiment, the compensation network for each sub-converter includes a single capacitor connected between the error-amplifier output and a reference voltage to achieve dominant-pole compensation. Alternatively, the compensation network includes one or more resistors and one or more capacitors for pole-zero cancellation.

Figure 10:
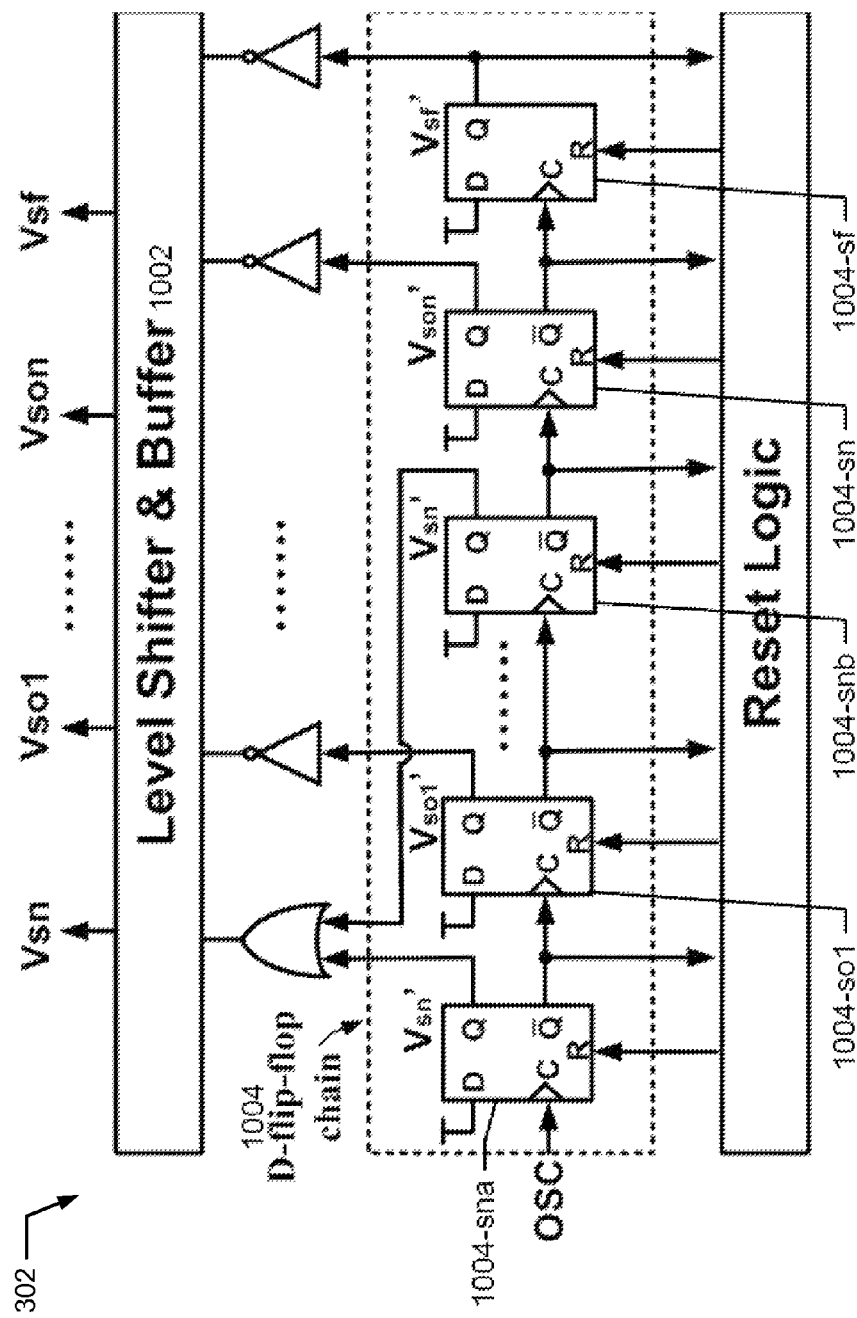
FIG. 10 depicts one embodiment of the logic unit shown in FIG. 3.

Regulator 300 further includes a logic unit 302 for controlling the switches according to a clock signal generated by a pulse-width modulation (PWM) generator 306. FIG. 10 depicts one embodiment of logic unit 302 with a standard level shifter and buffer 1002. Logic unit 302 is further discussed hereinafter in keeping with the operations of regulator 300.

Figure 11:
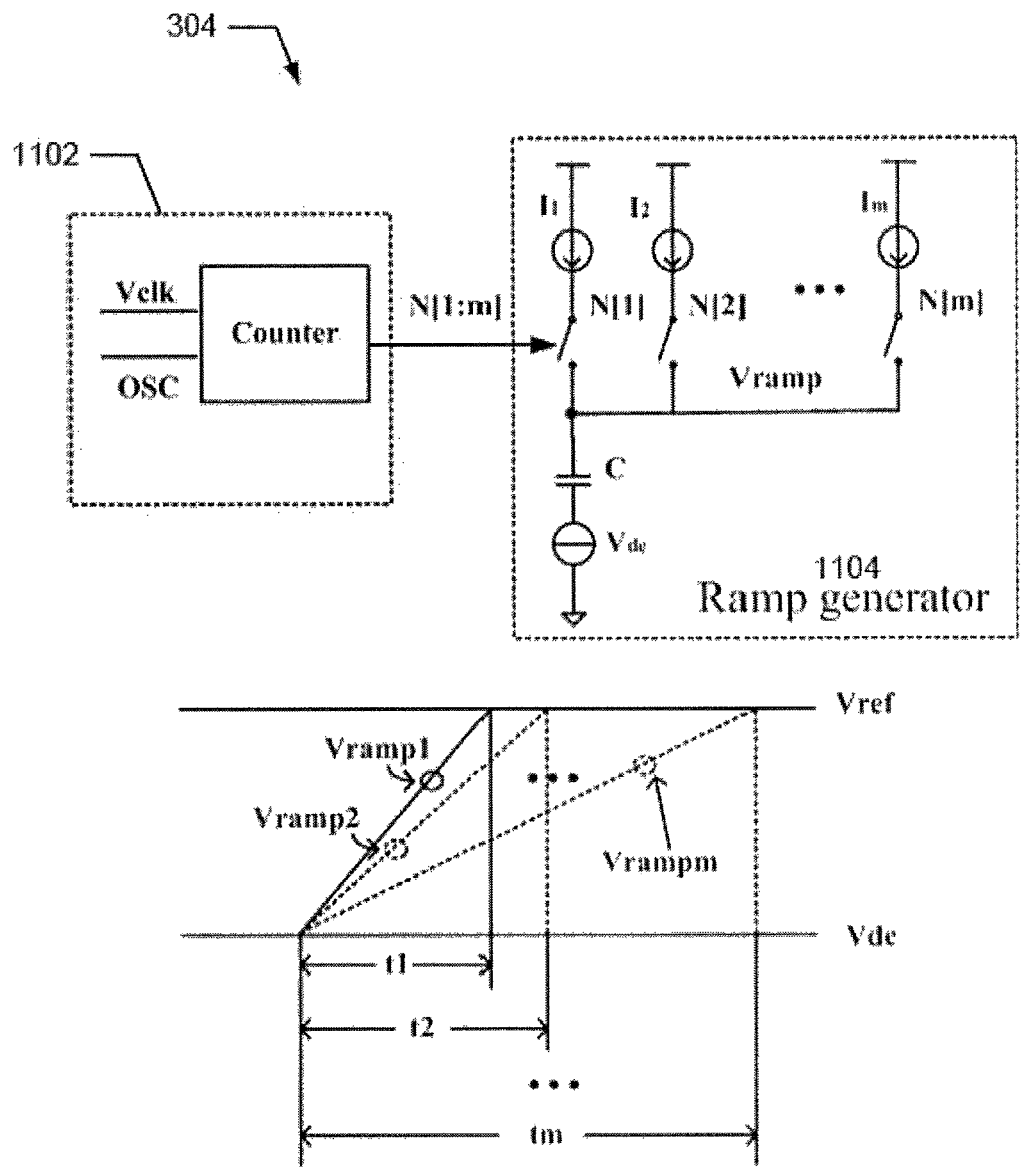
FIG. 11 depicts one embodiment of the frequency detection unit shown in FIG. 3.

In addition, a frequency detection unit (FDU) 304 is used to detect the switching frequency of the system. An embodiment of FDU 304 with a ramp generator is depicted in FIG. 11. As shown in FIG. 11, FDU 304 can be simply implemented by a digital counter 1102. The Vclk signal with the switching frequency information generated from the logic unit 302 and the OSC signal with the fundamental switching frequency information generated from clock generator 310 are input to digital counter 1102. Digital counter 1102 calculates the frequency relationship of the Vclk and OSC signals and output the calculated value, N[1:m], where m is an integer here. This value N[1:m] is used to control the predefined current paths I1-Im in ramp generator 1104. The predefined currents I1-Im carry different current levels with I1>I2> . . . >Im.

Figure 7:
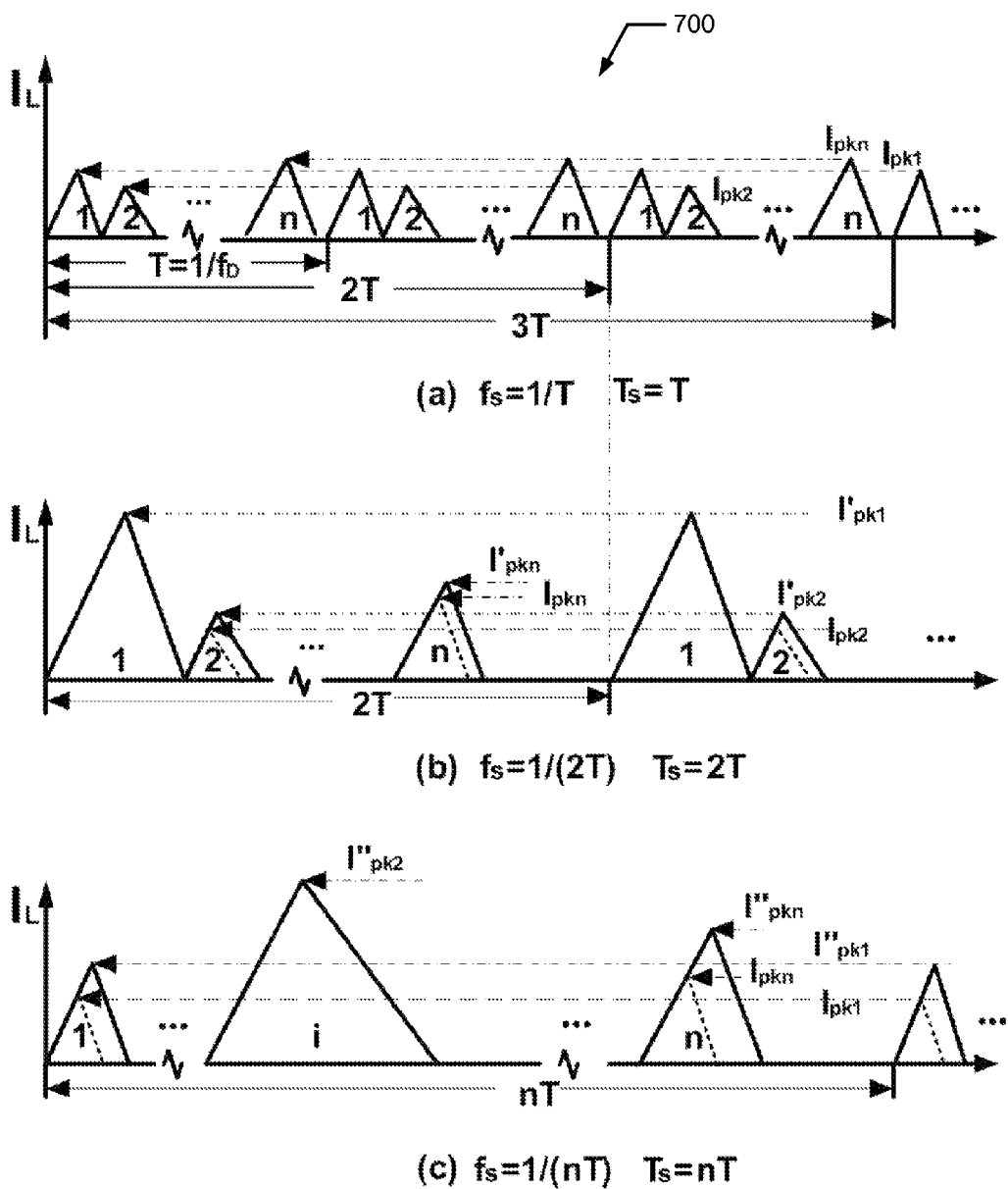
FIG. 7(a)-7(c) depict timing diagrams of the inductor current in the SIMO converter of FIG. 3 with constant-charge-auto-hopping control.

According to a further embodiment, N[1:m] is equal to $f_{osc}/f_{Vclk}$, where $f_{osc}$ is the frequency of the OSC signal and $f_{Vclk}$ is the frequency of the Vclk signal. Specifically, when $f_{osc}$ is equal to $f_{Vclk}$, N[1:m]=1; when $f_{osc}$ is equal to two times of $f_{Vclk}$, N[1:m]=2; when $f_{osc}$ is equal to m times of $f_{Vclk}$, N[1:m]=m. The predefined current in ramp generator 1104 can be selected by N[1:m] returned from FDU 304. By keeping the capacitor C and the ramp reference Vref constant, the slope of the ramp signal Vramp and the time for the Vramp cut the Vref will change correspondingly to the currents I1-Im. When N[1:m] is equal to any of 1-m, the ramp charging time is equal to respective t1, t2, or tm, as shown in FIG. 11. This time is used to control the inductor peak current as shown in FIG. 7. Then, the inductor peak current is set to the required level in one switching cycle with fixed reference voltages Vref. Here, Vref can be a predefined voltage or the output voltage of the error amplifier.

The peak inductor current is then set to the required level in one switching period and the output voltage of error amplifier 308 is kept unchanged. The output signal from PWM generator 306 can be adjusted accordingly based on the information of the switching frequency so as to minimize the cross-regulation of the system.

As further shown in FIG. 3, each output switch (i.e., $S_{o1}$-$S_{on}$) includes a zero current detection (ZCD) which provides a discontinuous conduction mode (DCM) operation to block the negative current flow through the PMOSs switches and to isolate the control circuitry of the sub-converters.

A clock generator 310 is used to generate the fundamental switching frequency ($f_D$) for system 300. High voltage selector logic 302 selects the highest voltage from $V_g$, $V_{out1}$, $V_{out2}$, to $V_{outn}$ to power the substrate of the PMOS (VB). A buffer, which is part of logic circuit 302, and a current sensor 312 are used to detect the peak inductor current for protection. The logic and buffer control circuit 302 generates proper gate driver voltages for the switches.

The operation principle of switching regulator 300 is explained as follows. In general, energy transfer from inductor L to an output is started after the energy transfer to a previous output is completed. Switch $S_f$ is used for suppressing the inductor ringing due to resonance during the freewheeling period, where conductor L is not connected to any of the outputs. The size of switch $S_f$ is sufficient to allow a very small amount of current flow through switch $S_f$ in this period.

Figure 4:
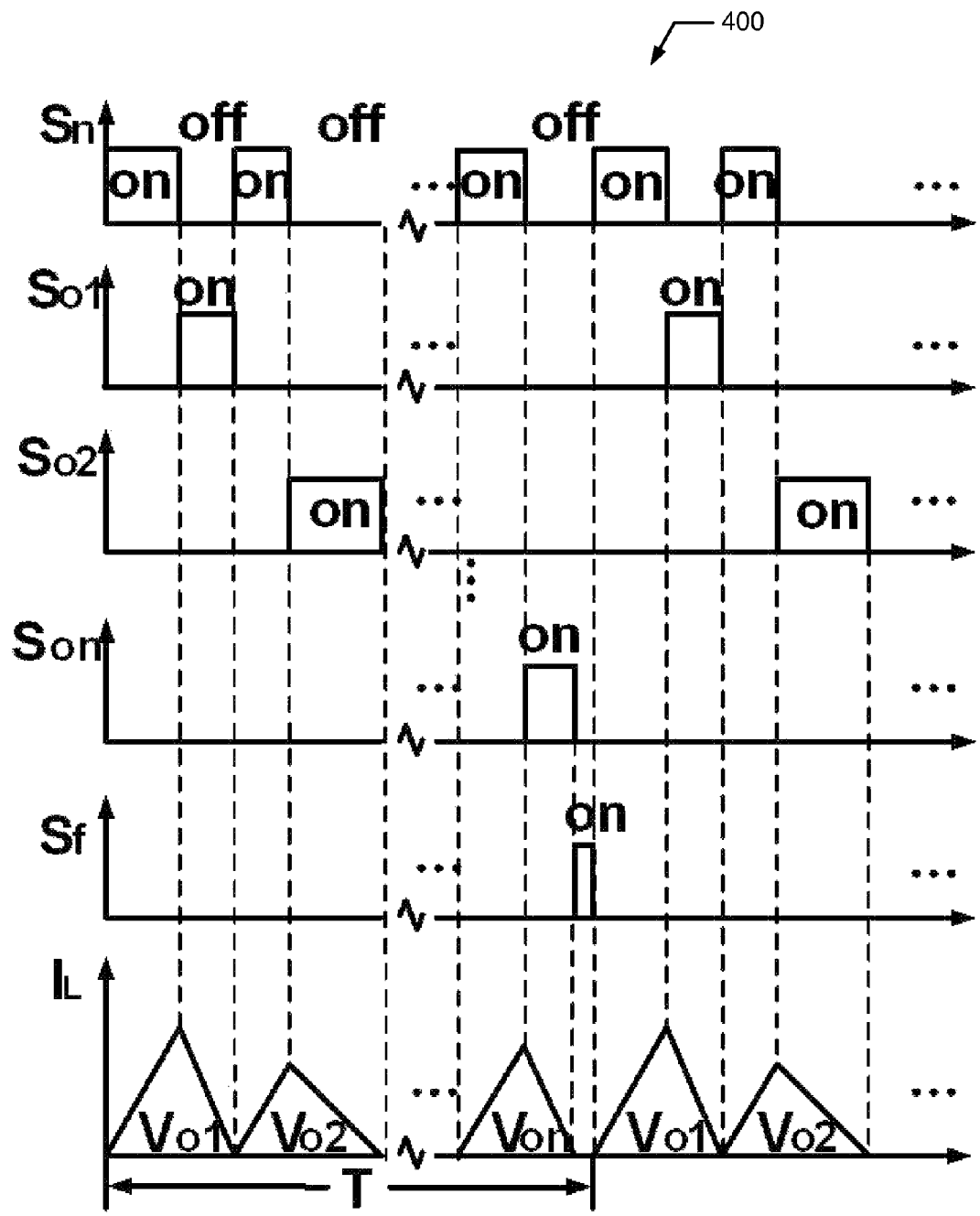
FIG. 4 depicts a timing diagram of the SIMO boost converter of FIG. 3.
Figure 5:
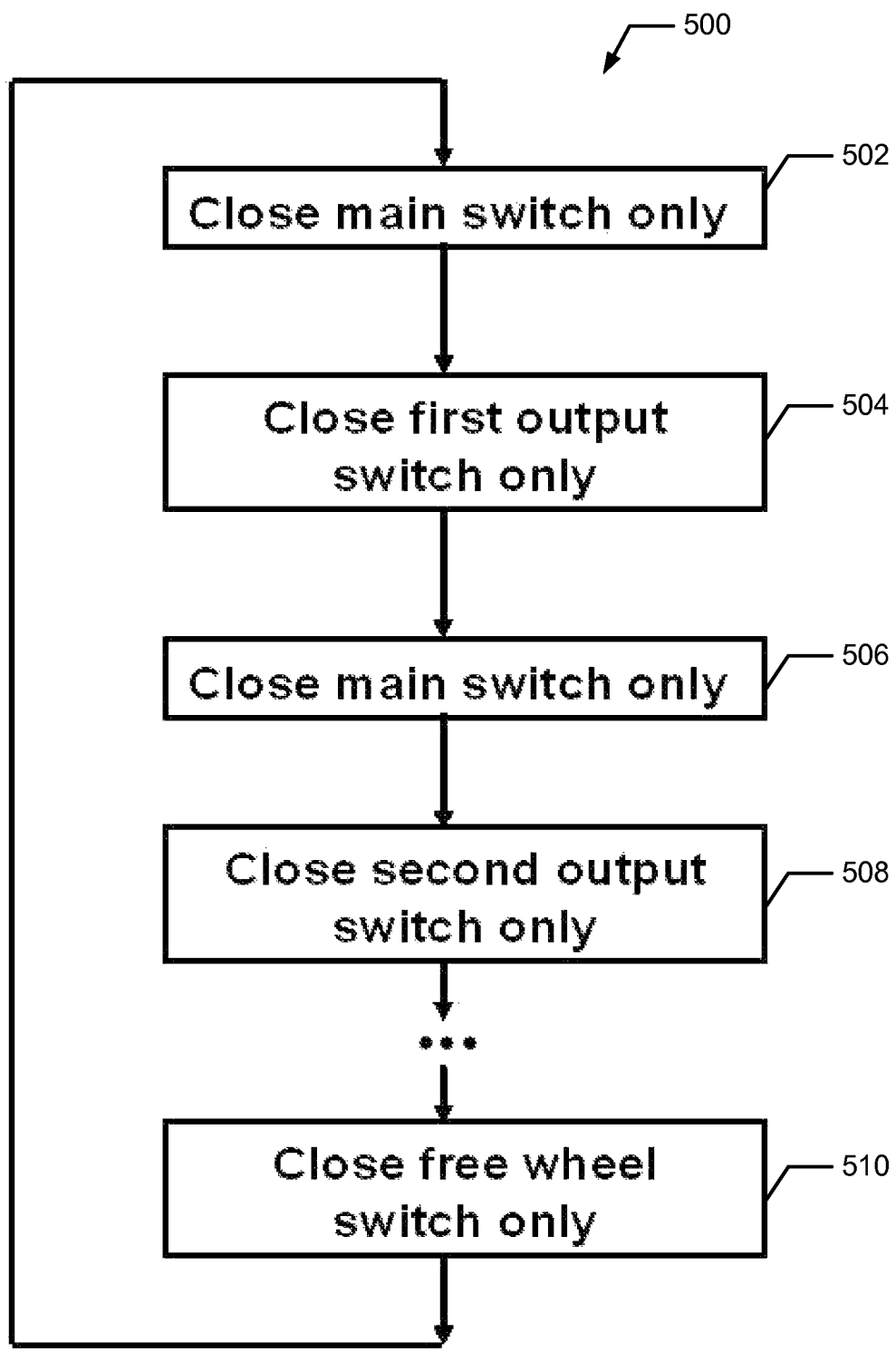
FIG. 5 depicts a flow diagram illustrating the operation of the SIMO converter of FIG. 3.

According to a further embodiment of the present invention, the output signals $V_{out1}$-$V_{outn}$ are regulated independently through controlling main switch $S_n$, and output switches $S_{o1}$-$S_{on}$. The operation of this control mechanism is further explained with reference to the timing diagram of FIG. 4 and the flowchart of FIG. 5. In particular, when main switch $S_n$ is turned on (i.e., closed) by the control signal from logic unit 302, the inductor current $I_L$ increases with a slope of $V_g/L$. When $I_L$ reaches a current level $I_{pk1}$ determined by error amplifier and compensation network 308, main switch $S_n$ is turned off and output switch $S_{o1}$ corresponding to the first output signal $V_{out1}$ is turned on. Then $I_L$ starts to decrease with a slope of $(V_{out1}-V_g)/L$, transferring the accumulated energy from inductor L to the output $V_{out1}$. As soon as logic unit 302 detects the inductor load current $I_L$ decreases to zero, output switch $S_{o1}$ is turned off and main switch $S_n$, is turned on again, causing the inductor load current start to increase again with a slope of $V_g/L$. When inductor load current $I_L$ reaches a current level $I_{pk2}$ determined by error amplifier and compensation network 308, main switch $S_n$, is turned off and output switch $S_{o2}$ is turned on. Then inductor load current $I_L$ starts to decrease with a slope of $(V_{out2}-V_g)/L$, as the accumulated energy is transferred from inductor L to output $V_{out2}$. As soon as inductor load current $I_L$ decreases to zero, output switch $S_{o2}$ is turned off and main switch $S_n$ is turned on again. This sequential-control process is continued till energy is transferred to the last output stage $V_{outn}$. After that, main switch $S_n$ and output swishes $S_{o1}$-$S_{on}$ are turn off and switch $S_f$ is turned on until the end of the switching cycle so as to suppress the inductor ringing.

As shown in FIG. 10, logic unit 302 includes proper logic used to control the operation sequence of converter 300. A D-flip-flop chain 1004 with D-flip-flop buffers (1004-*sna*, 1004-*snb*, 1004-*so*1, ..., 1004-*son*, and 1004-*sf*) used to generate the driver signals for various switches, as shown in FIG. 10. The D-flip-flops in D-flip-flop chain 1004 are used to control the turn-off and turn-on of the switches $S_n$, $S_{o1}$-$S_{on}$, and $S_f$, respectively. The D-flip-flops, 1004-*sna* and 1004-*snb*, for controlling the $S_n$ are reset by inductor peak current signal. The D-flip-flops, 1004-*so*1, ..., 1004-*son*, for controlling switches $S_{o1}$ to $S_{on}$ are reset by the inductor zero current signal. The start of one switching period is triggered by the internal clock signal, OSC. The inductor peak current signal is generated when inductor current increases to a peak value determined by the error amplifier and compensation network 308. Then, $S_n$ is turned off and $S_{o1}$ is turned on. The inductor current then decreases until it is equal to zero. The inductor zero current signal is generated by the zero current detection (ZCD). Switch $S_{o1}$ is then turned off and switch $S_n$ is turned on for the next output, $V_{out2}$. The inductor current increases again and reaches another peak level for the second output $V_{out2}$ determined by the error amplifier and compensation network 308. This inductor peak current signal resets one D-flip-flop, so that switch $S_n$, is turned off and $S_{o2}$ is turned on. The operation repeats and the switches $S_n$ and $S_{oi}$, i=1, 2, ..., n, are turned on and off in sequence until $S_{on}$ is turned off when the inductor current drops to zero. The next switching cycle is started. The sequential-control is achieved by this simple logic. Based on this sequential control, the switch is turned on only after the previous switch is turned off, dead-time is realized to prevent shoot-through current from appearing in any synchronous switching converters.

Figure 6:
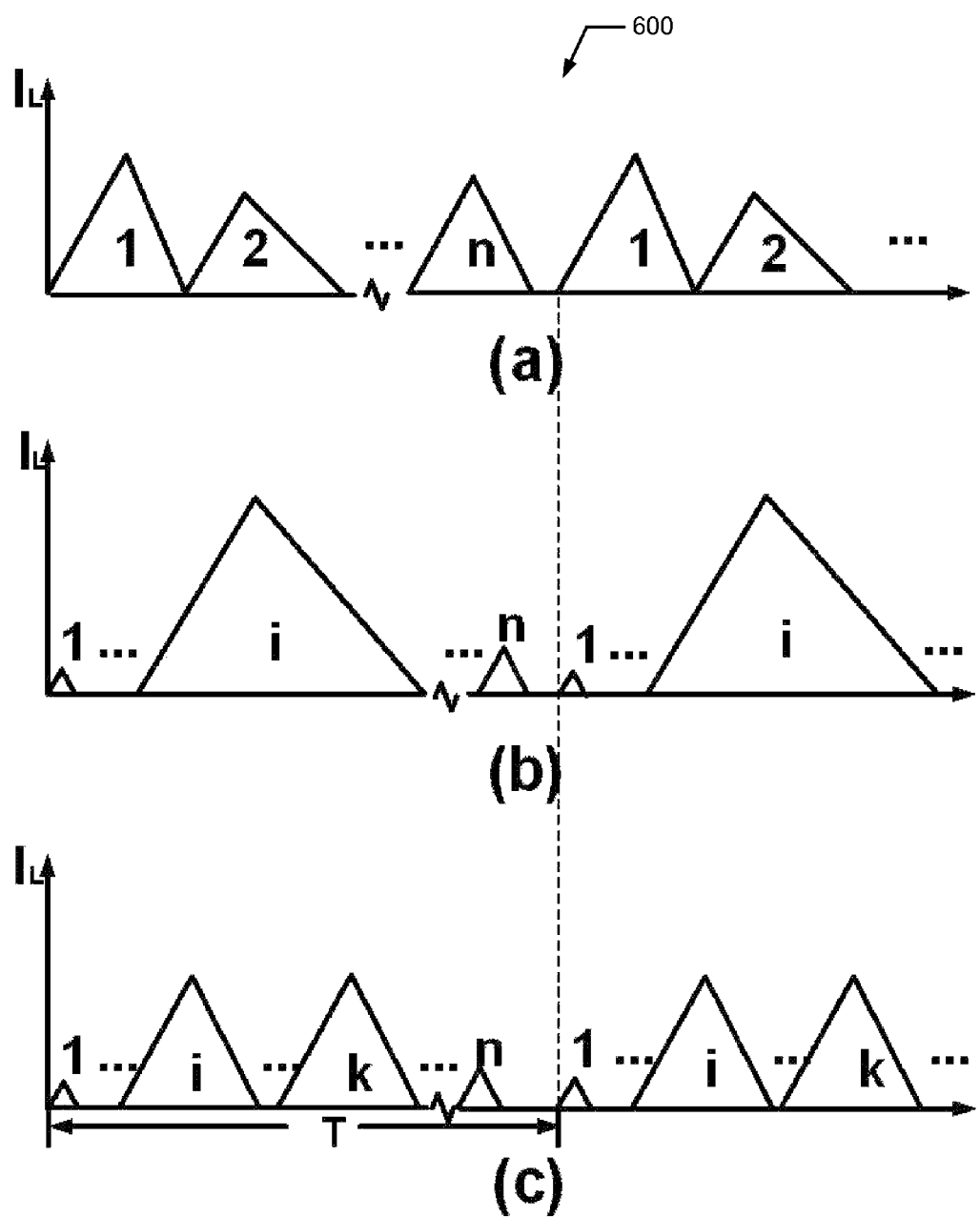
FIGS. 6(a)-(c) depict timing diagrams of the inductor current in the SIMO converter of FIG. 3 with unbalanced loads.

Based on previous discussion, one still in the art would appreciate that this sequential-control method is particularly beneficial for multiple outputs converter having large or unbalanced loads as further shown in FIG. 6. Specifically, the load current of inductor L corresponding to each output $V_{out1}$-$V_{outn}$ can be set flexibly through logic unit 302 and error amplifier and compensation network 308. At the same time, system 300 can maintain a total maximum power capacity, which is the sum of the output power at $V_{out1}$-$V_{outn}$, for a particular pre-defined switching frequency.

FIG. 7 further shows the CCAH control to extend the power capacity of system 300. When the total time required to complete one cycle of energy transfer from the voltage source $V_g$ to all of the outputs $V_{out1}$-$V_{outn}$ is longer than one fundamental period T, the switching period is automatically extended to 2T, 3T, etc., depending on the total current load. Accordingly, the switching frequency is automatically hopped to 1/N of the fundamental switching frequency, where the switching noise spectrum of the system can be predictable. Here, N is an integer. This CCAH control is very easy to realize in system 300 because no fixed time slot is assigned to each output $V_{out1}$-$V_{outn}$. The power capacity of system 300 can be substantially extended. During load transient, system 300 not only chooses the required switching frequency based on the total load current but also ensure to a regulated voltage delivered to the output terminal, so as to minimize cross-regulation of the converter during frequency hopping.

As further shown in FIG. 7, when there is a frequency hopping induced by the load transient at one output, for example, $V_{out1}$, in order to maintain the unchanged charge delivered to the other outputs, logic unit 302 immediately changes the inductor peak current for other outputs $V_{out2}$-$V_{outn}$. Accordingly, in order to achieve a constant charge delivery to the other outputs, the transition current levels of the other outputs are change from $I_{pk2}$ to $I_{pk2}'$, $I_{pk3}$ to $I_{pk3}'$, etc. FIG. 7(*b*) illustrates frequency hopping when the switching period is adjusted to 2T, where the peak value $I_{pk2}'$ of the load current corresponding to the second output $V_{out2}$ doubles the peak current of $I_{pk2}$ of the load current corresponding the second output when system 300 operates under fundamental frequency. Similar adjustments can be performed the load current when the switching period is larger than 2T as shown in FIG. 7(*c*). This system 300 not only minimizes the cross-regulation at the outputs, but also enables a fast transient response as the peak inductor current ($I_{pk1}$) based on the load information.

Figure 8:
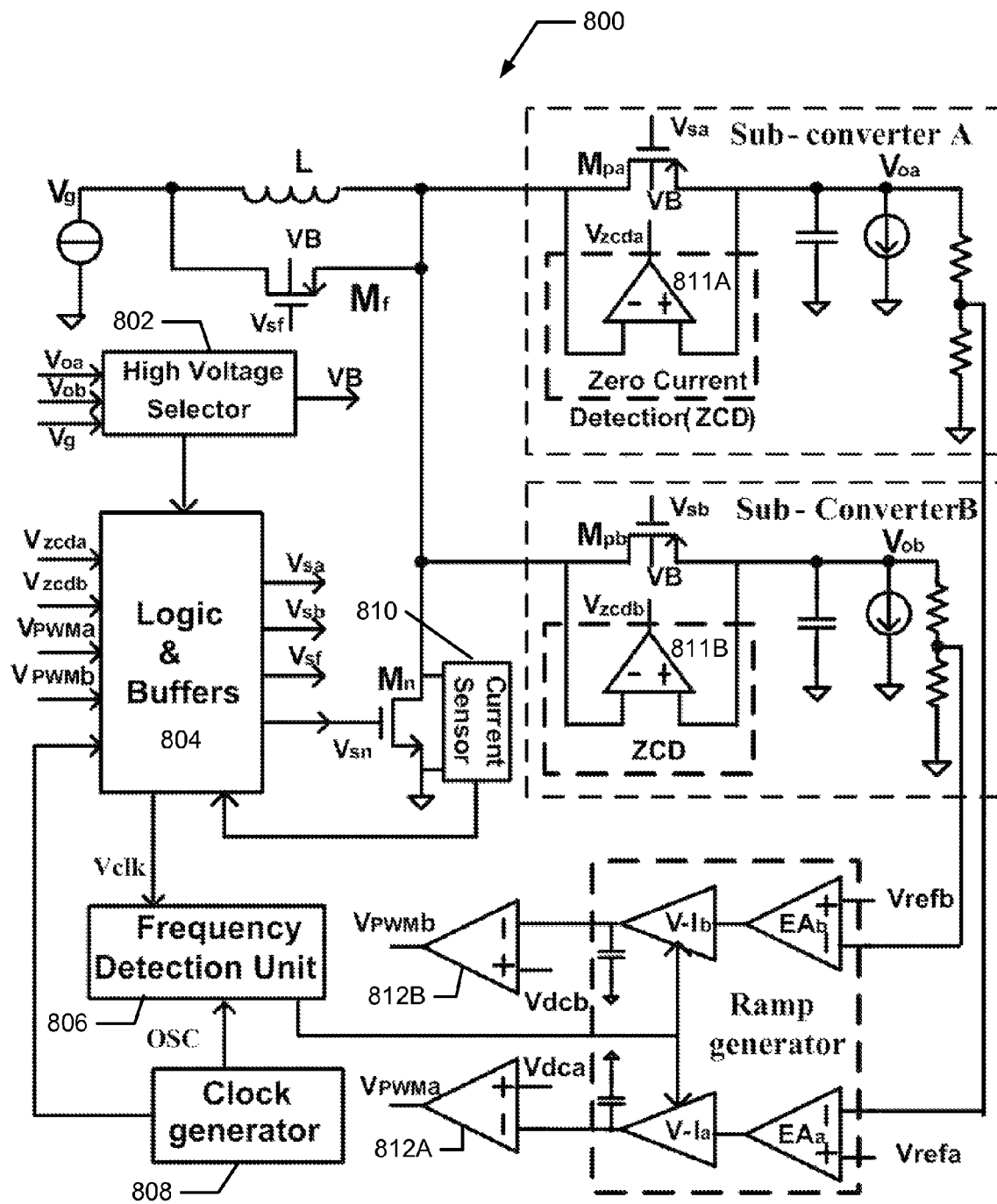
FIG. 8 depicts a schematic diagram of a SIMO boost DC-to-DC converter in accordance to an embodiment of the present invention.

FIG. 8 shows a schematic diagram of a single-inductor-double-output boost DC-to-DC converter 800 in accordance to another embodiment. The main switch includes a NMOS $M_n$, output switch 1 includes a PMOS Mpa, and output switch 2 includes a PMOS Mpb. Each of Zero Current Detector (ZCD) 811A and 811B includes a topology implemented according to an active diode technique as well known in the art. For the discontinuous-conduction-mode (DCM) operation, ZCD 811A and 811B can block the negative current flow through bidirectional switches Mpa and Mpb, and isolate the control circuitry of sub-converters A and B. A clock generator is used to generate the fundamental switching frequency ($f_D$) for system 800.

Similar to system 300, the change of the switching frequency is detected by frequency detection unit (FDU) 806, which then controls the voltage-to-current converter (V-$I_a$ and V-$I_b$) for minimizing the cross-regulation. A high voltage selector 802 is used to select the highest voltage from Vg, Voa and Vob to power the substrate of the PMOS switches including $M_{pa}$, $M_{pb}$ and $M_f$. A current sensor 810 is used to detect the peak inductor current. Logic and buffer control circuit 804 generates the proper gate driver voltages for the switches.

In system 800, one method to adjust the charging time of inductor current includes controlling the output voltage of the error amplifiers (EAs) $EA_a$ and $EA_b$, which are used to generate the ramp signal through V-I converters. Since a compensation network exists at the output of the EAs, it is difficult to directly increase or decrease its value expeditiously (such as in one switching cycle). An alternate method includes adjusting the current in the V-I converters, which is much easier to implement. The switching frequency information generated from FDU 806 is used to control the charging or discharging of the current in the V-I converters. Therefore, the inductor load current charging time (i.e., peak inductor current) will be set to the required level in one switching cycle with fixed reference voltages Vdca and Vdcb. FDU 806 can be simply implemented by a counter where the Vclk signal generated from the gate driver voltage of the main switch Mn carriers the information of switching period Ts.

Figure 9:
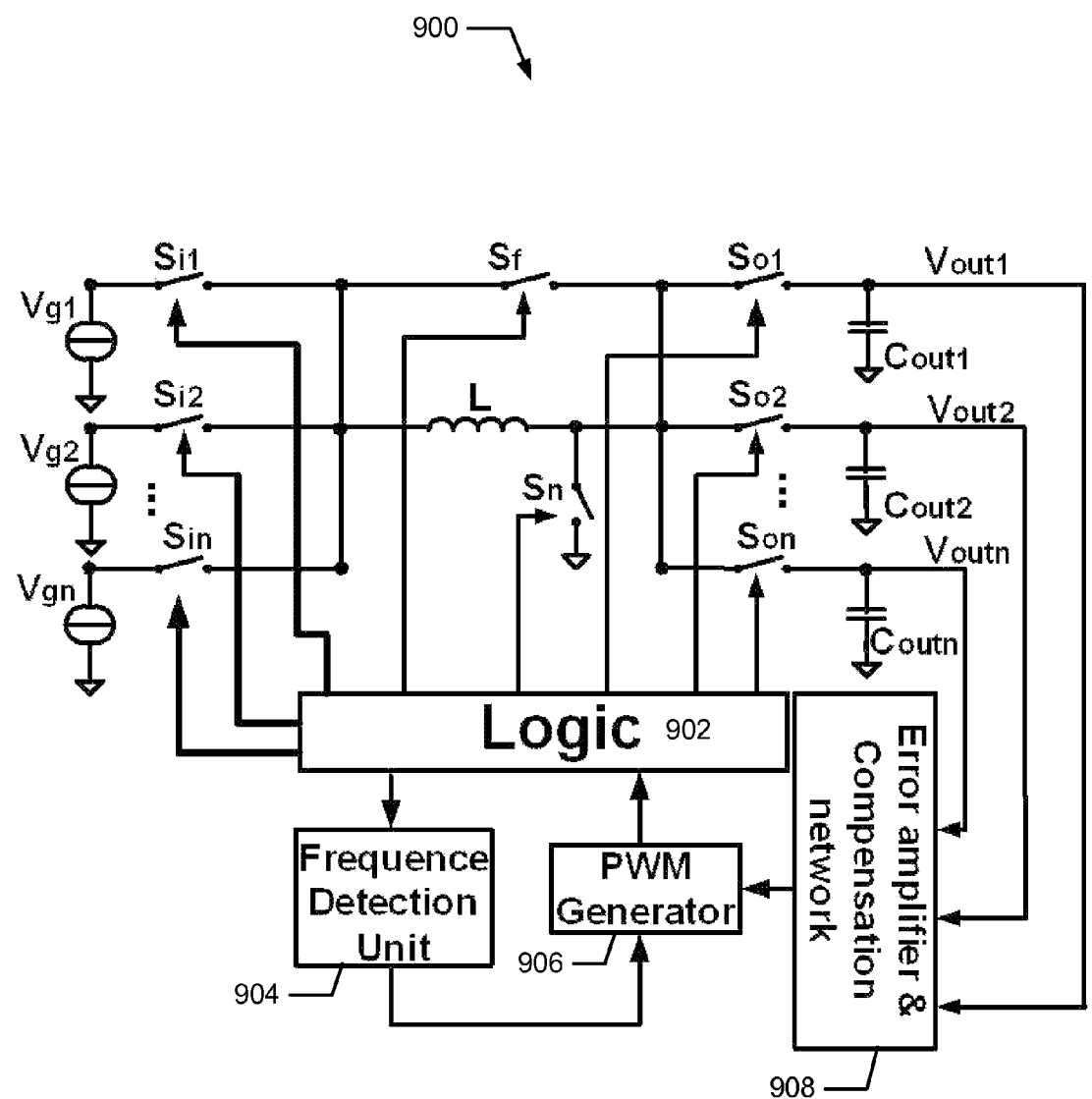
FIG. 9 depicts a schematic diagram of a single-inductor-multiple-input-multiple-output (SI-MIMO) boost converter according to an embodiment of the present invention.

The principle of the present invention can be implemented in various SIMO and single-inductor multiple-input-multiple-output (SI-MIMO) switching regulators as well. FIG. 9 depicted an exemplary embodiment of an SI-MIMO boost converter. Rearranging or add adding switches to the power stage can achieve other kinds of regulators such as buck converter, buck-boost converter, boost-buck converter, and so on.

According to FIG. 9, output signals $V_{out1}$-$V_{outn}$ are regulated independently through controlling input switches $V_{g1}$-$V_{gn}$, main switch $S_n$ and output switches $S_{o1}$-$S_{on}$. When input switch $S_{i1}$ is selected and turned on with main switch $S_n$ by control signals from logic unit 902, the inductor L starts to accumulate energy from the selected input, when the inductor L gets proper charges determined by error amplifier and compensation network 908, main switch $S_n$ is turned off and output switch $S_{o1}$ corresponding to the first output signal $V_{out1}$ is turned on. Then inductor L starts to transfer the accumulated energy to the output $V_{out1}$. As soon as logic unit 902 detects the inductor load current $I_L$ decreases to zero, output switch $S_{o1}$ is turned off and main switch $S_n$ is turned on again to accumulate charge, this process proceeds until the last output stage $V_{outn}$ gets its energy. After than, main switch $S_n$ and output swishes $S_{o1}$-$S_{on}$ are turn off and switch $S_f$ is turned on until the end of the switching cycle so as to suppress the inductor ringing.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A switching regulator comprising:
a voltage source for providing electrical energy;
an inductive element coupled to the voltage source for accumulating the electrical energy, the inductive element having first and second nodes;
a main switching element connected between the second node of the inductive element and a reference voltage;
a plurality of output switching elements corresponding to a plurality of outputs, each coupled between the second node of the inductive element and a respective output terminal;
a freewheel switching element coupled in parallel with the inductive element between the first and second nodes of the inductive element; and
a controller for coordinating the plurality of output switching elements and the main switching element so as to switching the inductive element to each of the plurality of output terminals within a switching period for generating a regulated DC voltage at the respective output terminal from the electrical energy,
wherein the controller is configured to adjust, based on a respective output load corresponding to each output, duration of a charge and transfer period corresponding to each output independently for each output; and
wherein each output has a respective charge and transfer period within the switching period including charging of the inductive element and transfer of energy from the inductive element to the respective output.

2. The switching regulator of claim 1, wherein the controller further comprises:
a frequency detection unit for detecting a switching frequency of the switching regulator;
at least one error amplifier for each respective output terminal, each error amplifier having a pair of differential inputs and a single-ended output;
a compensation network connected to each error amplifier; and
a pulse-width-modulation generator
a logic unit for controlling the main switching element, the freewheeling element, and the plurality of output switching elements.

3. The switching regulator of claim 2, wherein the output of the at least one error amplifier is used for controlling the electrical energy delivered to each respective output terminal during a load transient so as to maintain a substantially constant voltage level at the respective output terminal.

4. The switching regulator of claim 2, wherein the pulse-width-modulation generator comprises:
a clock generator for generating a clock signal having a fundamental frequency corresponding to a fundamental period; and
a ramp generator for generating a ramp signal having an auto-hopping frequency corresponding to an auto-hopping period, wherein the auto-hopping period corresponds to the switching period and is an integer multiple of the fundamental period.

5. The switching regulator of claim 1, wherein the controller is configured to control the switching of the electrical energy to each of the output terminals so as to maintain a substantially constant voltage level at each respective output terminal.

6. The switching regulator of claim 2, wherein the logic unit generates a switch driver signal having a frequency equal to the switching frequency.

7. The switching regulator of claim 1, wherein, within the switching period, the controller is configured to:
(a) close the main switching element so as to accumulate the electrical energy in the inductive element;
(b) sequentially close each of the plurality of output switching element so as to transfer the accumulated electrical energy from the inductive element to the respective output terminal; and
(c) close the freewheel switching element and open all other switching elements.

8. The switching regulator of claim 1, wherein each of the main switching element, the freewheel switching element, and the plurality of output switching elements includes a transistor.

9. A switching regulator comprising:
a plurality of sources for providing electrical energy;
an inductive element for accumulating the electrical energy from at least one of the plurality of sources, the inductive element having first and second nodes;
a plurality of input switching elements, each coupled between the first node of the inductive element and respective one of the plurality of sources;
a main switching element connected between the second node of the inductive element and a reference voltage;

a plurality of output switching elements corresponding to a plurality of outputs, each coupled between the second node of the inductive element and a respective output terminal;

a freewheel switching element coupled in parallel with the inductive element between the first and second nodes of the inductive element; and a controller for coordinating the plurality of input switching elements, the plurality of output switching elements, and the main switching element so as to switch the inductive element to each of the plurality of output terminals within a switching period so as to generate a regulated DC voltage at each respective output terminal from accumulated electrical energy, wherein the controller is configured to adjust, based on a respective output load corresponding to each output, duration of a charge and transfer period corresponding to each output independently for each output, the duration of the energy charge and transfer period being; and wherein each output has a respective charge and transfer period within the switching period including charging of the inductive element and transfer of energy from the inductive element to the respective output.

10. The switching regulator of claim 9, wherein each of the plurality of sources includes one of an external electrical source and an output voltage from one of the plurality of output terminals.

11. The switching regulator of claim 10, wherein the controller is configured to select one of the plurality of sources at a beginning of each switching period by closing the corresponding input switching element.

12. A method for generating a plurality of regulated DC voltages from at least one electrical source, comprising:

within a first charge and transfer period within a switching period, accumulating electrical energy in an inductive element and transferring at least a portion of the accumulated electrical energy to a first output terminal; and within a second charge and transfer period within the switching period, accumulating electrical energy in the inductive element and transferring at least a portion of the accumulated electrical energy to a second output terminal;

wherein duration of the first charge and transfer period is different from the duration of the second charge and transfer period, and the first and second charge and transfer periods are based on first and second loads at the respective output terminals.

13. The method of claim 12, wherein the switching period corresponds to a fundamental period of a clock of the switching regulator, and wherein the method further comprises:

in response to a change in an output load, adjusting the switching period to a different integer multiple of the fundamental period.

* * * * *

UNITED STATES PATENT AND TRADEMARK OFFICE
CERTIFICATE OF CORRECTION

| | | |
|---|---|---|
| PATENT NO. | : 8,624,429 B2 | Page 1 of 1 |
| APPLICATION NO. | : 12/840149 | |
| DATED | : January 7, 2014 | |
| INVENTOR(S) | : Jing et al. | |

It is certified that error appears in the above-identified patent and that said Letters Patent is hereby corrected as shown below:

In the Claims

Column 7, line 62, "switching" should read -- switch --.

Column 8, line 49, "element" should read -- elements --.

Column 9, lines 18-19, ", the duration of the energy charge and transfer period being" should be deleted.

Signed and Sealed this
Twenty-second Day of July, 2014

Michelle K. Lee
*Deputy Director of the United States Patent and Trademark Office*